(12) United States Patent
Hellige et al.

(10) Patent No.: US 12,278,469 B2
(45) Date of Patent: Apr. 15, 2025

(54) SENSOR-MONITORED PLUG-IN INTERFACE IN A FEEDTHROUGH HOUSING

(71) Applicant: HARTING ELECTRIC GMBH & CO. KG, Espelkamp (DE)

(72) Inventors: Denny Hellige, Espelkamp (DE); Christian Behning, Espelkamp (DE); Christian Bohne, Espelkamp (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 891 days.

(21) Appl. No.: 17/429,904

(22) PCT Filed: Feb. 7, 2020

(86) PCT No.: PCT/DE2020/100076
§ 371 (c)(1),
(2) Date: Aug. 10, 2021

(87) PCT Pub. No.: WO2020/164661
PCT Pub. Date: Aug. 20, 2020

(65) Prior Publication Data
US 2022/0140585 A1    May 5, 2022

(30) Foreign Application Priority Data
Feb. 11, 2019 (DE) .............. 10 2019 103 260.1

(51) Int. Cl.
*H02G 3/08* (2006.01)
*B61G 5/10* (2006.01)
*G01D 11/24* (2006.01)

(52) U.S. Cl.
CPC .............. *H02G 3/086* (2013.01); *B61G 5/10* (2013.01); *G01D 11/245* (2013.01)

(58) Field of Classification Search
CPC .......... G01D 11/245; H02G 3/086; B61G 5/10
See application file for complete search history.

(56) References Cited

U.S. PATENT DOCUMENTS

| 6,004,162 A | 12/1999 | Harting et al. |
| 6,935,881 B2 * | 8/2005 | Kainz .................... H01R 24/38 |
| | | 439/135 |

(Continued)

FOREIGN PATENT DOCUMENTS

| CN | 206712157 U | 12/2017 |
| DE | 102 30 379 A1 | 1/2004 |

(Continued)

OTHER PUBLICATIONS

Chinese Office Action, mailed Jun. 6, 2022, for Chinese Application No. 202080012182.8, 10 pages.

(Continued)

*Primary Examiner* — Robert J McCarry, Jr.
(74) *Attorney, Agent, or Firm* — Seed IP Law Group LLP

(57) ABSTRACT

A feedthrough housing, used in the railway sector, is provided wherein the feedthrough housing has at least one plug-in interface, which has plug connector modules, wherein the plug-in interface additionally has at least two sensors, a first sensor and a second sensor, wherein the feedthrough housing has a sensor box, which has at least two sensors, a third sensor and a fourth sensor. In the method for integrated monitoring of a plurality of plug-in interfaces of the railcars of a train: a) first data from a plurality of sensors are generated by each of the plug-in interfaces, b) wherein the first data generated at each plug-in interface are transmitted to a sensor box connected for data transfer to the plug-in interface, c) wherein second data are generated by the sensors of the sensor box, d) wherein the first and the second data are transmitted together from the sensor box via a switch infrastructure to a central evaluation unit and/or to (Continued)

a central monitoring station, and e) wherein a digital twin of the train comprising a plurality of railcars is calculated from the first and second data by the central evaluation unit and/or by the central monitoring station.

10 Claims, 2 Drawing Sheets

(56) References Cited

U.S. PATENT DOCUMENTS

| | | | |
|---|---|---|---|
| 7,258,559 B2 * | 8/2007 | Mattern | H01R 13/6315 439/35 |
| 2004/0053528 A1 | 3/2004 | Kainz et al. | |
| 2005/0253726 A1 | 11/2005 | Yoshida et al. | |
| 2011/0093144 A1 * | 4/2011 | Goodermuth | H04L 12/40169 246/167 R |
| 2018/0162423 A1 * | 6/2018 | Zhang | B61G 7/14 |
| 2018/0257683 A1 | 9/2018 | Govindappa et al. | |

FOREIGN PATENT DOCUMENTS

| | | | | |
|---|---|---|---|---|
| DE | 10 2005 022 281 A1 | 12/2005 | | |
| DE | 10 2010 052 667 A1 | 5/2012 | | |
| DE | 102013204342 A1 * | 6/2014 | | B61G 5/10 |
| DE | 10 2013 016 550 A1 | 4/2015 | | |
| EP | 0 860 906 A2 | 8/1998 | | |
| EP | 2 746 129 A1 | 6/2014 | | |
| WO | 03/029059 A1 | 4/2003 | | |
| WO | 2013/164420 A2 | 11/2013 | | |
| WO | 2013/169650 A1 | 11/2013 | | |
| WO | 2015/148042 A1 | 10/2015 | | |
| WO | WO-2018204313 A1 * | 11/2018 | | F21S 8/086 |

OTHER PUBLICATIONS

European Patent Office, International Search Report and Written Opinion for international application No. PCT/DE2020/100076, mailed Apr. 9, 2020, 13 pages (with English translation of International Search Report).

German Patent Office, Office Action for German application No. 10 2019 103 260.1 dated Nov. 19, 2019, 10 pages.

International Preliminary Report on Patentability; dated Aug. 10, 2021; for International Application No. PCT/DE2020/100076, 9 pages.

* cited by examiner

SENSOR-MONITORED PLUG-IN INTERFACE IN A FEEDTHROUGH HOUSING

BACKGROUND

Technical Field

The disclosure relates to a sensor-monitored feedthrough housing for installation in a wagon of a train. The disclosure relates furthermore to a method for the integrated monitoring of a plurality of plug-in interfaces of wagons of a train.

Plug-in interfaces of this type are integrated in particular in feedthrough housings. Feedthrough housings are required in order to guide cables or lines out of a closed region into another region and conversely.

Description of the Related Art

The publication EP 2 845 277 A2 discloses a feedthrough housing. The feedthrough housing comprises a plug-in interface that comprises contact elements for the transmission of electric current and/or signals. A plug connector can be connected to the plug-in interface.

Feedthrough housings of this type are used in particular in the railway sector in order to connect the wagons of a train to one another via cables. The cables can convey electric current. However, in general, cables that convey signals (FOC cables) are also provided.

The plug-in interfaces between the wagons must be inspected regularly and where necessary replaced as a precautionary measure. This results in high maintenance costs.

During the priority application regarding the current application, the German Patent and Trademark Office has researched the following prior art: WO 2013/169650 A1 and WO 2015/148042 A1.

BRIEF SUMMARY

Plug-in interfaces for wagons of a train, which incur low maintenance costs while simultaneously being reliable, are disclosed herein.

A sensor-monitored feedthrough housing comprises at least one plug-in interface. The plug-in interface essentially comprises a recess that is located in the feedthrough housing and a retaining frame that is equipped with plug connector modules is installed in the recess. The publication EP 0 860 906 B1 discloses such a retaining frame for retaining plug connector modules and for installation in the mentioned recesses.

The plug connector modules comprise contact elements. The contact elements serve to transmit electric current and signals. Furthermore, the plug-in interface comprises at least two sensors, namely, a first sensor and a second sensor. The sensors can be integrated for example likewise in plug connector modules. Alternatively, the plug-in interface can be connected only via cables to external sensors that are located for example in the proximity of the bogie of the wagon.

A sensor box is arranged in the feedthrough housing. In turn, at least two sensors, namely, a third sensor and a fourth sensor, are arranged within the sensor box.

Advantageously, the plug-in interface and the sensor box are connected to one another in such a manner as to enable the transmission of data. The connection to enable the transmission of data can be realized via cables or via a radio connection or a wireless local area network connection. The two sensor pairs (pair 1: first and second sensor) and (pair 2: third and fourth sensor) are arranged spaced apart from one another. As a result, the sensor pairs cannot have a negative effect on one another.

In an advantageous embodiment, the first sensor is a temperature sensor and the second sensor is a distance sensor. It is possible by way of the temperature sensor to detect in good time any potential risks, for example, as a result of a temperature increase in the case of the transmission of high electric currents. The distance sensor can detect for example that a plug connector is incorrectly plugged into the interface.

It is advantageous if the third sensor is a vibration and acceleration sensor and the fourth sensor is a moisture sensor. Data that is provided by the vibration and acceleration sensor renders it possible to forecast the serviceable life of the plug-in interface. Data provided by the moisture sensor renders it possible to detect in good time that, for example, the seals in the region of the plug-in interface are deteriorating or that moisture is penetrating into the cable hose between two plug-in interfaces. Moisture can cause the contact elements of the plug connection to corrode prematurely and fail. In this case, suitable measures can be undertaken in good time with a view to eliminating the leakage. The data provided by all the sensors renders it possible to realize an appropriate cost with regard to maintenance. It is no longer necessary to replace the plug-in interface as a preventative measure.

In an advantageous embodiment, the sensor box comprises means or devices with which the data of the first sensor, of the second sensor, of the third sensor and of the fourth sensor can be collected, stored and relayed. The means or devices can be computer hardware that comprises a processor and a memory element. The data can be advantageously processed in the sensor box in that it can be provided with a suitable voice protocol. The voice protocol is adapted to suit the respective receiver. In order to transmit data, a WiFi module is provided, for example, at the sensor box with the result that data or the processed data can be transmitted via a wireless local area network.

It is particularly advantageous if it is possible to access the sensor box externally and the data can be called up via such a request. In this case, the data is encrypted according to the prevailing security criteria. An authorized third party possesses the code to decrypt the data. The sensor box comprises in this case suitable hardware and software.

During the inspection of a train and its wagons, the wagons that are connected via the plug-in interfaces are separated from one another. It is to be ensured that the plug connectors together with the cables that are located between said plug connectors are subsequently re-connected to the correct plug-in interface. In one advantageous variant of the disclosure, the plug-in interface of the feedthrough housing therefore comprises an RFID transponder. The plug connector that is to be plugged into the respective plug-in interface could be equipped accordingly with an RFID reader. It is thus possible during the plug-in procedure to establish whether the plug connector has been plugged into the correct plug-in interface.

The plug-in interfaces of the feedthrough housing can be monitored as follows:
  a. Initially, each of the plug-in interfaces of the feedthrough housings generates first data from the respective plurality of sensors.
  b. Subsequently, the first data that is generated at the respective plug-in interfaces is transmitted to a sensor box that is connected to the plug-in interface in such a manner as to enable the transmission of data and is arranged in the feedthrough housing.

c. Simultaneously second data is generated by sensors that are arranged in the sensor box.

The first data that is supplied by the sensors to the sensor box and the second data that is generated by the sensors of the sensor box are stored or processed in the sensor box and relayed. The stored or generated data can be used, for example, for the purpose of creating a wear profile of the train or of the wagon and to draw conclusions regarding possible operational malfunctions from the wear profile.

d. The first and second data are relayed jointly from the sensor box to a network switch.

A suitable network switch infrastructure is provided for this purpose.

The data can be processed in or by the sensor box in that it can be provided with a suitable voice protocol. A multiplicity of voice protocols are stored or are available for this purpose in the sensor box. As a consequence, a reliable network communication is also guaranteed with different (voice) participants.

Data of a plurality of feedthrough housings can converge in a network switch. Generally a wagon of a train comprises a plurality of feedthrough housings and accordingly an associated plurality of plug-in interfaces. All the data of these feedthrough housings converge in a network switch.

The first and second data are transmitted by the network switch to a central evaluating unit and/or to a central monitoring station.

The central evaluating unit can be located in the train. The train or its control unit comprises for this purpose a suitable hardware or software. The central monitoring station can be a decentralized monitoring station in the form of a train operator's building that is equipped with the relevant computer technology.

e. A digital twin of the train comprising a plurality of wagons is calculated or simulated by the central evaluating unit and/or the central monitoring station from the first and second data.

The digital twin can be illustrated on the one hand in the train. In this case, operating parameters can be monitored. In the ideal case, measures can be undertaken in good time to prevent an operational malfunction, for example a malfunction of the internet connection for the railway customers. The digital twin can be used by the central monitoring station, for example, for the purpose of generating effective maintenance plans and avoiding train cancellations in the most preventive manner possible.

BRIEF DESCRIPTION OF THE SEVERAL VIEWS OF THE DRAWINGS

An exemplary embodiment of the invention is illustrated in the drawings and is explained in detail below. In the drawings.

The figures illustrate in part simplified schematic views. In part, identical reference numerals are used for similar but possibly not identical elements. Different views of similar elements may be scaled differently.

DETAILED DESCRIPTION

Figure 1:
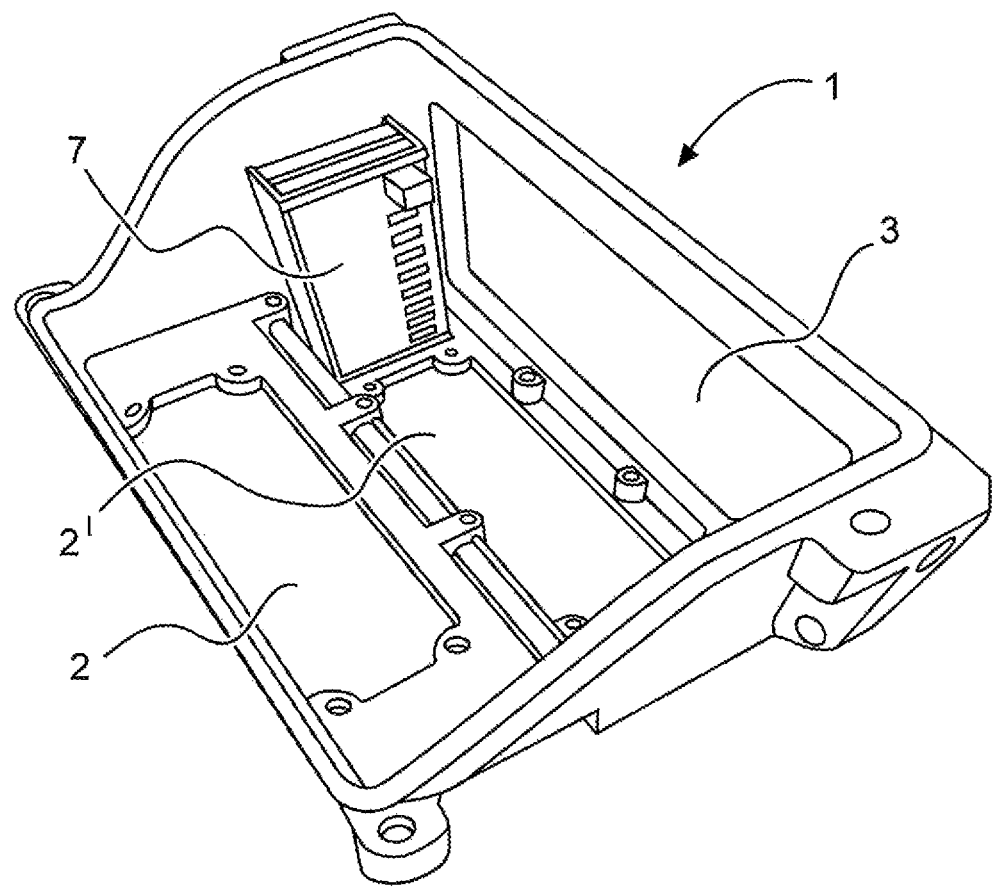
FIG. 1 illustrates a perspective view of a feedthrough housing.

FIG. 1 illustrates a perspective view of a feedthrough housing 1 that is provided for installation in a wagon 8, 8', 8" of a train. The feedthrough housing 1 comprises two recesses 2, 2' into which in each case a plug-in interface 4 can be installed.

Figure 2:
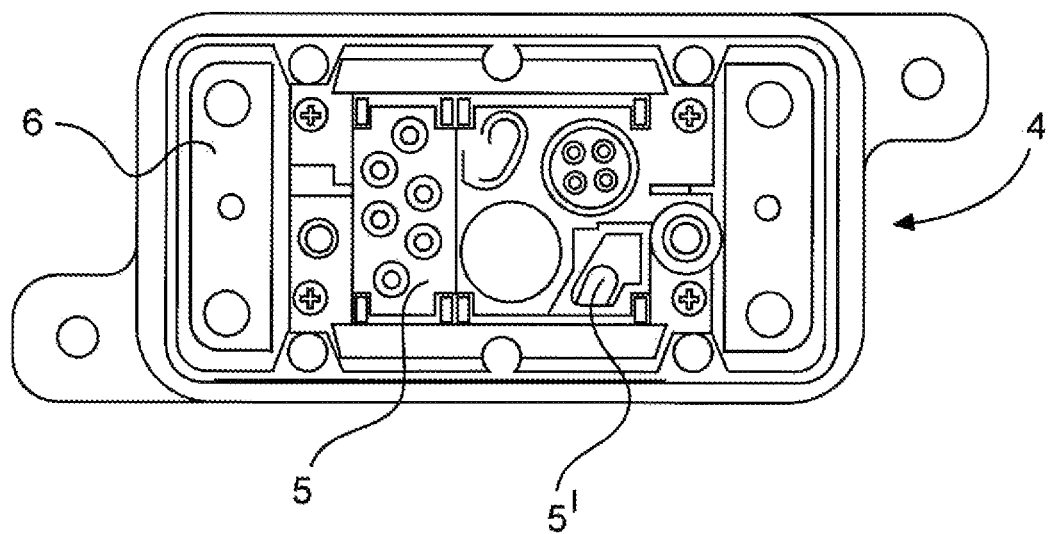
FIG. 2 illustrates a plan view of a plug-in interface for installation in the feedthrough housing and FIG. 3 illustrates a schematic view of a train.

The plug-in interface 4 comprises essentially a retaining frame 6 in which different plug connector modules 5, 5' are installed. A first sensor, e.g., a temperature sensor, and a second sensor, e.g., a distance sensor, are integrated into the plug-in interface 4. The sensors are not illustrated in detail in FIG. 2 for reasons of clarity.

A conductor feedthrough 3 is provided in the feedthrough housing 1. The cables that are eventually connected to the plug-in interface 4 are inserted through the conductor feedthrough 3 into the feedthrough housing 1.

A sensor box 7 is arranged in the feedthrough housing 1. A third sensor, e.g., a vibration and acceleration sensor, and a fourth sensor, e.g., a moisture sensor, are arranged in the sensor box 7. The sensor box 7 is connected to the plug-in interface(s) 4, for example, via an electrical cable in such a manner as to enable the transmission of data. All the data and even the data of the plug-in interface 4 converge in the sensor box 7. The sensor box 7 comprises a computer hardware with the result that the collected and generated data can be stored and processed. Furthermore, the sensor box 7 is able to transmit the data within a network, for example, via a wireless local area network. The data is first processed using a voice protocol that is required for this purpose. Various different voice protocols are stored in the memory of the sensor box 7 with the result that the sensor box 7 can communicate with different network participants.

The data (all sensor data) is relayed from the sensor box 7 via a network switch infrastructure 11, 11', 11" to a central evaluating unit 12 in the train and/or to a central monitoring station 13. A digital twin of the networking arrangement of the electrical train 9 together with the wagons 8, 8', 8" is calculated at these locations. The central evaluating unit 12 of the train is located, for example, in the driver's cab. It is possible in the driver's cab to monitor directly whether all sensor parameters are in the normal range.

Figure 3:
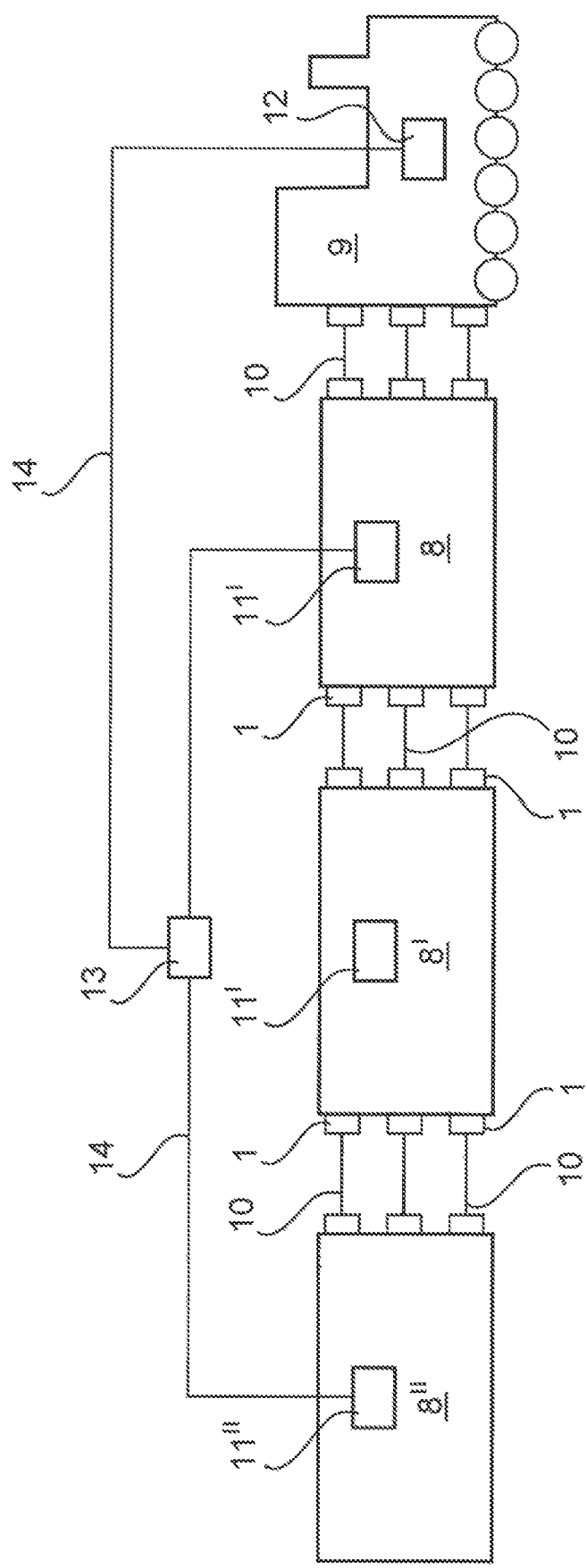

FIG. 3 illustrates a schematic view of a train 9 with individual wagons 8, 8', 8". Each wagon 8, 8', 8" comprises a plurality of feedthrough housings 1 that are described above. The individual wagons 8, 8', 8" are coupled to one another by way of the interfaces 4 of the feedthrough housing 1 via a cable 10. Generally, a plurality of cables 10 extend from the feedthrough housing 1 to the feedthrough housing 1 and said cables are generally embedded in a hose. For reasons of clarity, only one cable 10 is illustrated in each case in the figure.

The sensor data that is generated in the feedthrough housing 1 is relayed by way of the sensor box 7 to a network switch 11, 11', 11". The data is relayed via suitable data cables 14 that are not described in detail. Generally, each wagon 8, 8', 8" comprises a suitable network switch 11, 11', 11". The data is relayed by way of the network switch 11, 11', 11" to a central evaluating unit 12 in the train 9 and to a central monitoring station 13.

In the event that individual parameters or measurement values fall outside the normal range, it is possible to initiate counter measures rapidly. However, these measures are generally limited within the train 9. It is therefore logical to also monitor a digital twin of the train 9 at a central monitoring station 13 of the train operator, and from the results to draw conclusions for the maintenance of the train 9. It is thus possible to inspect systems of the train 9 with a view to preventative measures and this results in increased reliability of the train 9.

Even if different aspects or features of the disclosure are illustrated in the figures in each case in combination, it is obvious to the person skilled in the art—unless otherwise indicated—that the illustrated and discussed combinations are not the only possible combinations. In particular, mutually corresponding units or feature complexes of different exemplary embodiments may be exchanged with one another. Accordingly, aspects and features of the various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A feedthrough housing for installation in a wagon of a train, the feedthrough housing comprising:
    at least one plug-in interface provided in the feedthrough housing, wherein the at least one plug-in interface comprises plug connector modules and at least two sensors, namely, a first sensor and a second sensor, and wherein the at least one plug-in interface is configured to be coupled to a corresponding plug-in interface of an adjacent wagon of the train; and
    a sensor box provided in the feedthrough housing, wherein the sensor box is separate and distinct from the at least one plug-in interface and comprises at least two sensors, namely, a third sensor and a fourth sensor, such that the feedthrough housing installable in the wagon includes both of the at least one plug-in interface with the first sensor and the second sensor and the sensor box with the third sensor and fourth sensor.

2. The feedthrough housing as claimed in claim 1, wherein the first sensor is a temperature sensor and the second sensor is a distance sensor.

3. The feedthrough housing as claimed in claim 1, wherein the third sensor is a vibration and acceleration sensor and the fourth sensor is a moisture sensor.

4. The feedthrough housing as claimed in claim 1, wherein the plug-in interface and the sensor box are connected to one another via a data cable or a radio connection.

5. The feedthrough housing as claimed in claim 1, wherein the sensor box comprises means with which the data of the first sensor, of the second sensor, of the third sensor and of the fourth sensor can be collected, stored and relayed.

6. The feedthrough housing as claimed in claim 1, wherein the first and second sensor are arranged spaced apart from the third and fourth sensor.

7. The feedthrough housing as claimed in claim 1, wherein the plug-in interface of the feedthrough housing comprises an RFID transponder.

8. A method for the integral monitoring of a plurality of plug-in interfaces of wagons of a train,
    wherein each of the plug-in interfaces generate respective first data from a respective plurality of sensors of the plug-in interfaces,
    wherein the respective first data that is generated at the respective plug-in interfaces is relayed to a respective sensor box provided within the same wagon as a corresponding one of the plug-in interfaces, and wherein the respective sensor box is connected to the plug-in interface in such a manner as to enable the transmission of data therebetween,
    wherein respective second data is generated by a respective plurality of sensors of the respective sensor box,
    wherein the respective first and second data from the respective plurality of sensors of the respective plug-in interface and the respective plurality of sensors of the respective sensor box of each wagon of the train are relayed jointly from the respective sensor box by way of a network switch infrastructure to a central evaluating unit and/or to a central monitoring station, and
    wherein a digital twin of the train that comprises a plurality of wagons is calculated by the central evaluating unit and/or by the central monitoring station from the respective first and second data.

9. The method as claimed in claim 8, wherein the data that is supplied to the sensor box and the data that is generated by the sensor box are stored in the sensor box.

10. The method as claimed in claim 8, wherein the data is processed in the sensor box in that the data is provided with a suitable voice protocol.

* * * * *